US009172435B2

(12) United States Patent
Rhein et al.

(10) Patent No.: US 9,172,435 B2
(45) Date of Patent: Oct. 27, 2015

(54) APPARATUS FOR POWER TRANSMISSION AND FOR INDUCTIVE COMMUNICATION

(75) Inventors: Benjamin Rhein, Lörrach (DE); Andrew Green, Malsburg-Marzell (DE); Wolfgang Schnurbusch, Coppenbrügge (DE)

(73) Assignee: CONDUCTIX-WAMPFLER GMBH, Weil am Rheim (DE)

( * ) Notice: Subject to any disclaimer, the term of this patent is extended or adjusted under 35 U.S.C. 154(b) by 143 days.

(21) Appl. No.: 13/983,627

(22) PCT Filed: Feb. 8, 2012

(86) PCT No.: PCT/EP2012/052130
§ 371 (c)(1),
(2), (4) Date: Sep. 16, 2013

(87) PCT Pub. No.: WO2012/107490
PCT Pub. Date: Aug. 16, 2012

(65) Prior Publication Data
US 2014/0323040 A1    Oct. 30, 2014

(30) Foreign Application Priority Data

Feb. 9, 2011   (DE) ......................... 10 2011 010 792
Feb. 9, 2011   (DE) ......................... 10 2011 010 793

(51) Int. Cl.
*H04B 5/00*   (2006.01)
*B60L 5/00*   (2006.01)
(Continued)

(52) U.S. Cl.
CPC .............. *H04B 5/0031* (2013.01); *B60L 5/005* (2013.01); *H02J 5/005* (2013.01); *H04B 5/0037* (2013.01); *H01F 2038/143* (2013.01); *Y02T 90/16* (2013.01)

(58) Field of Classification Search
CPC .. H04B 5/0031; H04B 5/0037; H04B 5/0018; B61L 15/0072; B61L 27/0077; B61L 15/0018
See application file for complete search history.

(56) References Cited

U.S. PATENT DOCUMENTS 5,168,510 A    12/1992   Hill
7,019,620 B2   3/2006    Bohler et al.
(Continued)

FOREIGN PATENT DOCUMENTS

DE    3916610 A1    12/1989
DE    19512107 A1   10/1996
(Continued)

OTHER PUBLICATIONS

English translation of International Preliminary Report on Patentability (IPRP) published Aug. 13, 2013 for International Patent Application No. PCT/EP2012/052130, filed Feb. 8, 2012.
English translation of the Written Opinion (WO) published Aug. 8, 2013 for International Patent Application No. PCT/EP2012/052130, filed Feb. 8, 2012.
(Continued)

*Primary Examiner* — Andrew Wendell
(74) *Attorney, Agent, or Firm* — Fleit Gibbons Gutman Bongini & Bianco PL; Martin Fleit; Paul D. Bianco (57) ABSTRACT

Apparatus for power transmission and for inductive communication with a track or rail-guided moving object, with a power transmission line which extends along an envisaged path of movement of the object—with which a current collector can make contact—for supplying power to moving loads, a separate data line, at least one communication inductance on the object coupleable magnetically to the data line, and with a communication device which is connected to the communication inductance. The communication device has a modem which operates on the basis of an orthogonal frequency-division multiplexing method at a data rate of at least 50 MBit/s. One end of the data line is connected to a communication device connected to a central control unit and containing a modem of the same type as the communication device in the moving object.

17 Claims, 3 Drawing Sheets

(51) Int. Cl.
*H02J 5/00* (2006.01)
*H01F 38/14* (2006.01)

(56) References Cited

U.S. PATENT DOCUMENTS

| | | |
|---|---|---|
| 2004/0183640 A1 | 9/2004 | Bohler et al. |
| 2005/0103545 A1 | 5/2005 | Green et al. |
| 2009/0085706 A1 | 4/2009 | Baarman et al. |
| 2009/0186611 A1* | 7/2009 | Stiles et al. ............... 455/431 |
| 2011/0292921 A1* | 12/2011 | Hunter ....................... 370/338 |

FOREIGN PATENT DOCUMENTS

| | | |
|---|---|---|
| DE | 19649682 A1 | 6/1998 |
| DE | 20205352 U1 | 8/2003 |
| DE | 10216422 A1 | 10/2003 |
| WO | 03005380 A2 | 1/2003 |

OTHER PUBLICATIONS

International Search Report published Jun. 7, 2013 for PCT/EP2012/052130, filed Feb. 8, 2012.

* cited by examiner

APPARATUS FOR POWER TRANSMISSION AND FOR INDUCTIVE COMMUNICATION

FIELD OF THE INVENTION

The invention relates to an apparatus for power transmission and for inductive communication.

BACKGROUND OF THE INVENTION

A device for inductive power supply for moving objects, which also enables communication between the moving object and a central control unit, is known from DE 102 16 422 A1. In parallel to a conductor loop positioned along an envisioned movement path of the object, via which electrical energy can be transmitted to the object by inductive coupling to a collector arranged on the object, a data line is laid, via which the data signals can be transmitted, likewise by inductive coupling, to a different collector arranged on the object, to or from a transceiving device arranged on the vehicle. Only a frequency band in the range of 1 MHz and a data rate in the range of 9600 baud, but without more precise information, are specified for data transmission in the above-mentioned document.

WO 03/005380 A2 shows details of the combination of a conductor loop used for inductive transmission of energy to a moving load with a data line, including the integration of the two in a special cable. Frequency shift keying (FSK) is proposed there for modulating the data signal, and 10-150 kbit/s is mentioned as a general value for the range of transmission rates envisioned.

In contrast to this prior art, the transmission rate requirements today for communication between automatic transport vehicles and a central control unit, or between such vehicles, are orders of magnitude greater. There have been attempts to use local wireless networks (WLAN) according to IEEE Standard 802.11, for example, to meet these requirements. Problems in this case are, among others, gap-free coverage of the movement range of the vehicles, the electromagnetic interference level caused by various types of machinery in industrial plants, and the security of the communication relative to external noise or tampering.

Another known approach is the placement of a slotted microwave waveguide, into which respective antennas connected to the vehicles protrude, alongside the envisioned movement path of the vehicles. The problems connected with WLAN can indeed be avoided in this way, but this is purchased with a relatively high expense in the mechanical structure of the communications system, because a microwave waveguide has a rigid shape and the antenna must be precisely guided in the slot of the waveguide.

One aspect of the invention therefore addresses the problem of specifying a cost-effective and powerful solution for power transmission to and inductive communication with a track-bound or rail-bound moving object.

SUMMARY OF THE INVENTION

According to the invention, a modem operating according to an orthogonal frequency multiplex method with a data rate of at least 50 Mbit/sec is used for the communication in a device of the type in question for power transmission to and inductive communication with a track-bound or rail-bound moving object. Modems of this type have so far been used in order to be able to utilize the power supply network of a building for data transmission, the data signals being coupled into or decoupled from network lines via outlet sockets. Modems of this type are surprisingly also suitable for inductive communication with a moving object via a data line laid along the movement path of the object, the line being loosely coupled to a communication inductance arranged on the object.

This application is a seeming misuse in a double sense, because modems of this type are designed exclusively for stationary operation on the power supply network of a building and for shared use of network lines for data transfer. The present invention transcends these basic presuppositions. It even makes use of an undesired interference effect in data transmission via a power supply network, namely the fact that part of the power of the modulated data signal is irradiated into the environment along a network line, whereby the power that can be received at the end of the line decreases and radio reception equipment in the environment can be interfered with. According to the invention, however, this radiation is precisely what enables the inductive reception of the useful signal by other components.

The provision according to the invention of a separate data line despite the presence of a power transmission line also contradicts the basic concept of shared energy and data transmission over the same line, for which modems of the type in question are designed. Power transmission lines for supplying moving loads such as cranes, electric suspension railways and automatically controlled industrial trucks can be constructed as conductor loops for inductive energy withdrawal or as collector lines for contacting by a current collector, and typically operate with higher voltages than the normal system voltage, and higher powers flow therein. Additional voltage peaks occur during switching processes. Inductive power transmission lines are connected along the line to compensation capacitors so as to enable operation of the system in resonance. In collector lines, the bus bars are arranged in the interior of insulating profiles so that objects other than current collectors are kept away.

All these properties of power transmission lines for supplying moving loads are detrimental to their co-use for data transmission and must be taken into account accordingly in the design of the components used for data transmission. The provision of a separate data line, which seems unnecessary at first glance, overcomes these difficulties and considerably simplifies the requirements for components used for data communications. In addition, when safety-relevant fault situations appear in power transmission lines of the type in question here, there are emergency shutdowns. If the lines are also used for data communication, it would also be interrupted in case of a disconnection of the line sections as part of an emergency shutdown. The use of a separate data line, on the other hand, allows continuation of data communication even in the event of an emergency shutdown of the power transmission line.

There are currently standards in the form of ITU G.9960 and IEEE P1901 that apply to data transmission via power supply networks. These standards, in which application-specific details of the orthogonal multiplexing method are specified, among other things, can be obtained from the International Telecommunications Union or the Institute of Electrical and Electronics Engineers and are hereby incorporated into the present disclosure. HomeplugAV and G.hn are additional standards in the field of data transmission via power supply networks, which is also referred to as powerline communication technology. These as well are hereby incorporated as a component of the present disclosure. Use of hardware compliant with one of these standards guarantees long-term availability and reliable compliance with the corresponding specifications.

Expedient methods for use according to the invention of a modem of the above mentioned type are to increase the transmission power and the reception sensitivity. This affects the range of the data communication because, due to the comparatively large length of the data line and its loose coupling with the communication inductance, the communication path is subject to a substantially greater attenuation compared to the power supply network of a building with correspondingly shorter line length and fixed coupling of all subscribers to the network lines. The required function can be realized by an amplifier and/or by a transformer.

One end of the data line is connected to a communication device connected to a central control unit and containing a modem of the same type as the one that the communication device on the moving object has. Here as well, the intermediate connection of an amplifier and/or transformer is expedient for guaranteeing a long range.

A particularly advantageous aspect of the solution according to the invention is that modems of the type in question can be obtained cost-effectively on the market as consumer items and have a normal LAN connection in accordance with the IEEE 802.3 standard as the application interface, so that no expense is incurred for adapting the application interface. The onboard computer of the moving object equipped with a communication device according to the invention can be connected directly to the LAN port of the modem.

An untwisted symmetric two-wire line with a longitudinal center axis is preferably used as the data line, and a coil with a symmetrical cross-sectional shape is used as the communication inductance, wherein the coil is expediently constructed as a multilayer wiring board and individual windings of the coil are arranged on different layers of the circuit board and connected in series to one another by means of through-hole contacts between the layers. The number of windings must be matched to the strength of the magnetic field emitted by the data line. Under certain circumstances, only a single winding can be sufficient, for which one layer of a circuit board is sufficient. Of course, a coil with a conventional construction, designed as a wire loop or wire winding, can also be used.

In order to achieve a defined minimum quality of communication, i.e. a largely error-free data transmission at a rate of over 50 Mbit/sec, certain conditions must be maintained in the design of the device according to the invention with respect to line length and the distance of the communication inductance from the data line, these factors depending on the orientation of the data line and the communication inductance relative to one another (parallel or perpendicular).

In regard to electromagnetic compatibility, it is particularly advantageous if the data line is surrounded by a metal shield that has a slot running in its longitudinal direction, through which the communication inductance can be introduced in a position in the interior of the shield adjacent to the data line, in which it is magnetically coupled to the data line. Thereby the transmission quality can be improved, by largely avoiding the coupling of external interference signals into the data line and the communication inductance. At the same time, the emission of electromagnetic interference signals into the environment of the data line is largely avoided with inductive data communication. The shielding is particularly important for a high data rate of the inductive communication.

It is expedient if the data line is formed as an untwisted symmetric two-wire line and is arranged laterally offset relative to the slot in such a manner that the data communication inductance can be introduced into the position adjacent to the data line in the interior of the shield. The data line in this position is not only electromagnetically shielded but is also protected mechanically by the shielding from environmental influences, and the communication inductance can be moved close to the data line in an extremely simple manner and move at a constant distance away from the line. A hollow profile made of metal or metal-coated plastic, which simultaneously functions as a mechanical support for the data line, is preferably used as the shield.

It is additionally advantageous if the shield is mechanically connected to a support for the power line and a mount for the communication inductance is mechanically connected to a mount for a current collector. In this way, a very simple mechanical guidance system can be realized by guaranteeing the proper guidance of the communication inductance relative to the data line by means of the guidance of the current collector relative to the power line.

Another aspect of the invention is the use of a modem that is intended for communication between stationary subscribers via power supply lines of a building and operates according to an orthogonal frequency multiplexing method with a data rate of at least 50 Mbit/sec in a communication device for inductive communication with a track-bound or rail-bound moving object via a data line extending along an envisioned movement path of the object, the data line being parallel to and separate from a power transmission line constructed in particular in the form of a collector line that can be contacted by a current collector for supplying moving loads, wherein electrical energy can be extracted by the object during a movement and data can be picked up by at least one communication inductance on the object that can be magnetically coupled to the data line and the communication device. The communication device is preferably a component of an apparatus according to the invention of the type explained above.

BRIEF DESCRIPTION OF THE DRAWINGS

The description below of an embodiment with reference to the drawings discloses further details and advantages of the invention. Therein.

DETAILED DESCRIPTION OF THE INVENTION

Figure 1:
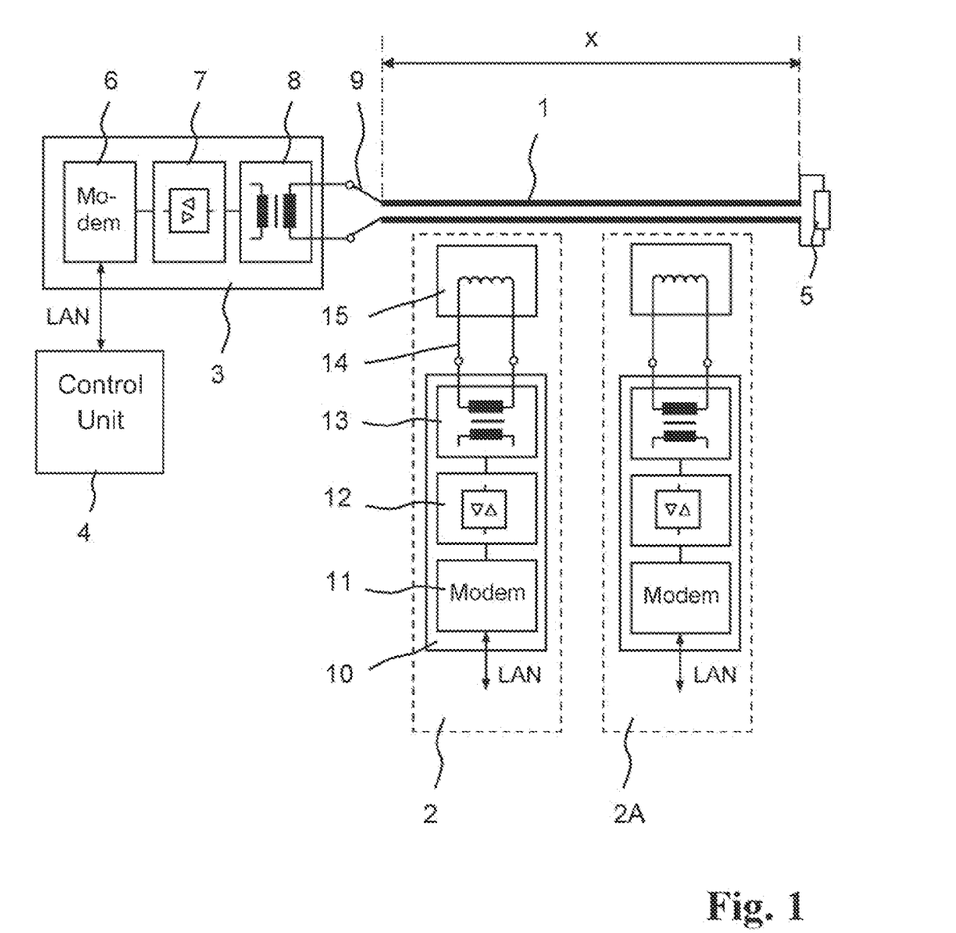
FIG. 1 shows a schematic overview of an apparatus according to the invention.

FIG. 1 shows a data line 1 consisting of an untwisted two-wire line. A stranded line with a distance between wires on the order of a few millimeters, for example 10 mm, is suitable for this purpose. The data line 1 is laid parallel to a power line, not shown, via which power can be transmitted inductively or conductively to moving objects 2, 2A, which move along the power line either rail-bound or automatically steered. Details of the arrangement of such a data line 1 on a power line are disclosed in the documents mentioned above, and therefore do not require explanation at this point.

The data line 1 is connected at one end to a communication device 3 of a central control unit 4, and at the other end to a terminating resistor 5. The communication device 3 of the central control unit 4 contains a modem 6, which is connected to the data line 1 via an amplifier 7, a transformer 8 and a supply line 9. A communication device 10 of the moving object 2 likewise contains a modem 11, which is connected to a communication inductance 15 via an amplifier 12, a transformer 13 and a supply line 14.

The communication inductance 15 is arranged on the object 2 in such a manner that the inductance always remains adjacent to the data line 1 during its movement along an intended movement path, and that there is a sufficient inductive coupling with the data line 1. Additional moving objects, which can be present in an arbitrary number, contain the same communication technology components 11-15 as the object 2, as indicated in FIG. 1 by the additional object 2A.

The modem 11 is a device that operates according to the orthogonal frequency multiplexing method with a high transmission rate of at least 50 Mbit/sec. Modems of this type are used for data communication via the lines of the power supply network in buildings and as such are available on the market, which is why a description of the internal structure and mode of operation can be dispensed with at this point.

For inductive communication with a moving object 2 via a data line 1 using a modem 11 of the type above-mentioned type, the modem must be connected to a communication inductance 15. It must also be noted that, due to the relatively large length of the data line 1 and the loose coupling between the data line 1 and the communication inductance 15, a higher transmission power on the data line 1 and a higher reception sensitivity, in comparison to stationary building communication, are generally required. Therefore, an amplifier 12 and a transformer 13 with an appropriately designed gain factor or transmission ratio are provided between the modem 11 and the associated communication inductance 15.

At the central control unit 4, the modem 6 of the communication device 3 there can be connected directly to the data line 1 via an amplifier 7 and a transformer 8. The amplifiers 7 and 12 and the transformers 8 and 13 are options, depending on the requirements. Only amplifiers 7 and 12 or only transformers 8 and 13 could also be used. It is understood that the amplifiers 7 and 12 and the transformers 8 and 13 must each be designed for bidirectional transmission. These components could also be dispensed with if there are low range requirements that can be met with the normal input and output stages of modems 6 and 11.

Figure 2:
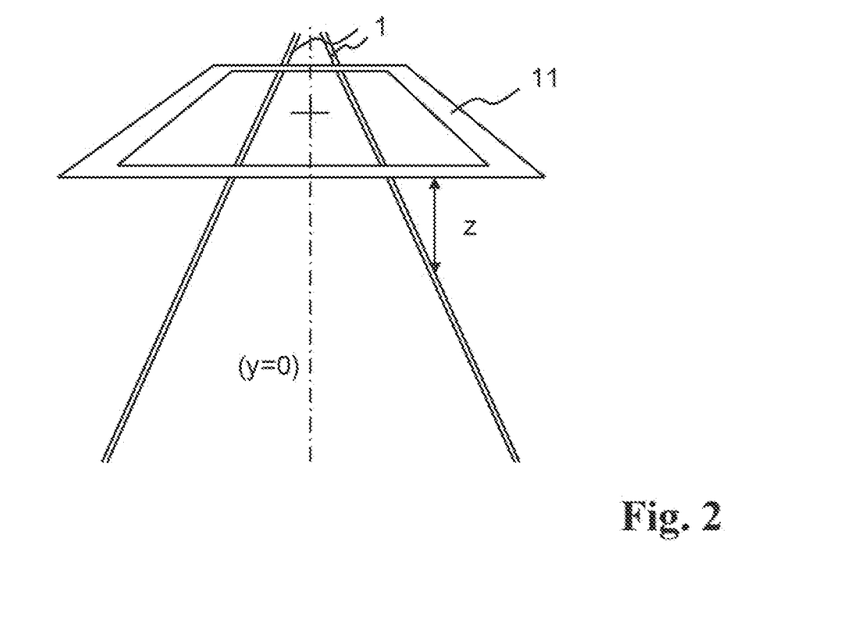
FIG. 2 shows a first arrangement of a communication inductance relative to a data line and FIG. 3 shows a second arrangement of a communication inductance relative to a data line.
Figure 3:
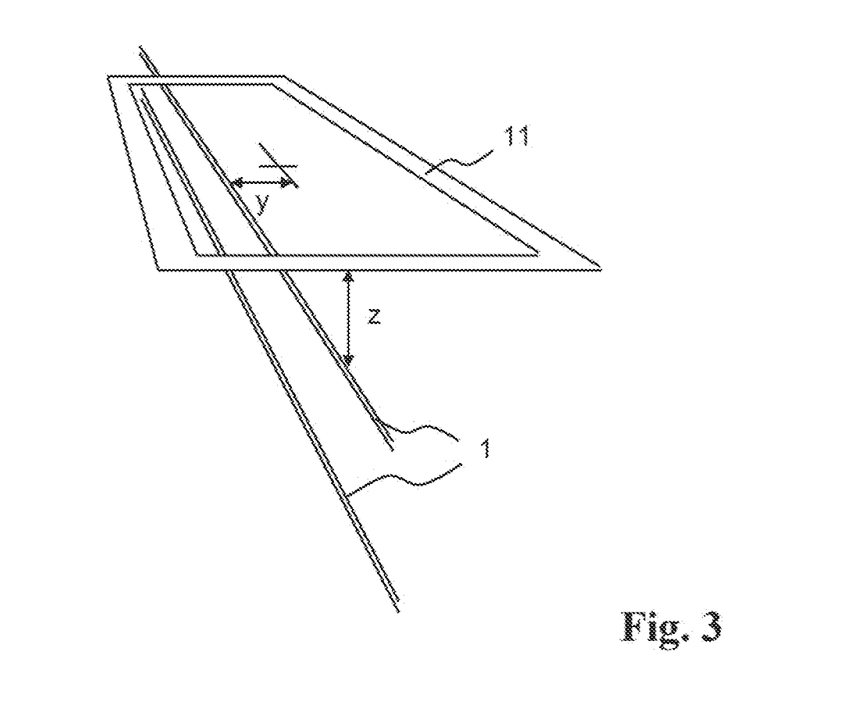

A coil with a flat design, which is constructed as a multi-layer circuit board, wherein the individual windings are each arranged on different layers of the circuit board and are connected in series to one another by means of through-hole contacts between the layers, is suitable as a communication inductance 15. FIGS. 2 and 3 schematically show two possible positions of such a communication inductance 15 relative to a data line 1, both cases assuming a perpendicular position of the central coil axis of the communication inductance 15, i.e. a parallel position of the coil cross-sectional surface to the movement surface of the moving object 2.

FIG. 2 shows the coil cross-sectional surface parallel to the plane defined by the two wires of the communication line 1 constructed as an untwisted two-wire line, whereas the cross-sectional surface is perpendicular thereto in FIG. 3. The arrangement according to FIG. 2 results if the data line 1 is laid parallel to the movement surface of the moving object 2, i.e. if the plane defined by the data line 1 is parallel to the movement surface of the object 2. The arrangement according to FIG. 3 results if the plane defined by the wires of the data line 1 is perpendicular to the movement surface of the moving object 2. Both arrangements are possible in principle.

The dimensions of the cross-sectional surface of the coil are adapted in one direction to the wire spacing of the data line 1 in such a manner that, in its cross-sectional direction, the coil clearly covers the data line 1 in the arrangement according to FIG. 2. In the illustrated example, this covering corresponds approximately to the wire spacing. The coil cross section can be extended in the direction perpendicular thereto, which corresponds in FIG. 2 to the longitudinal direction of the data line 1, in order to increase the sensitivity, the rectangular form shown in FIGS. 2 and 3 only representing one example. In principle, the coil could also have a rounded, e.g. elliptical cross-sectional shape.

In FIG. 2, the distance of the lower coil end face of the communication inductance 15 from the plane defined by the wires of the data line 1 is labeled z, whereas in FIG. 3, the distance of the lower coil end face from the closest of the two wires of data line 1 is labeled z. A lateral distance of the central axis of the communication inductance 11 from the plane defined by the wires of the data line 1 is labeled y in FIG. 3. The case in which the central axis of the communication inductance 15 lies directly above the central axis of the data line 1, drawn in dot-dash lines, i.e. in which the lateral distance between the two axes y=0, is shown in FIG. 2. If the communication inductance 15 were moved to the left or right in FIG. 2, then y≠0. The inductive coupling between the data line 1 and the communication inductance 15 decreases in both arrangements with an increasing distance y or z.

Other than by the coupling factor of the inductive coupling between the data line 1 and the communication inductance 15, the quality of an inductive data transmission for a given transmission power is also influenced by the signal attenuation through the data line 1 and through the supply lines 9 and 14 between the transformer 13 and the communication inductance 15, as well as that between the transformer 8 and the data line 1. It is known that such an attenuation increases with increasing line length. The length of the data line 1 is labeled x in FIG. 1. Labeling of the lengths of the supply lines 9 and 14 was dispensed with in FIG. 1, wherein the total length L, which represents the sum of the individual lengths of the supply lines 9 and 14, is crucial for the attenuation.

The present invention provides that, in order to maintain an acceptable transmission quality so as to guarantee a largely error-free transmission and a bit rate of at least 50 Mbit/sec, the above-explained distances x and y, as well as the line lengths x and L, must jointly satisfy a defined condition, the latter depending on whether the orientation of the data line 1 relative to the communication inductance 15 corresponds to the situation of FIG. 2 or that of FIG. 3. The formulas defining this condition are specified for the two cases in the subordinate claims 8 and 9.

Figure 4:
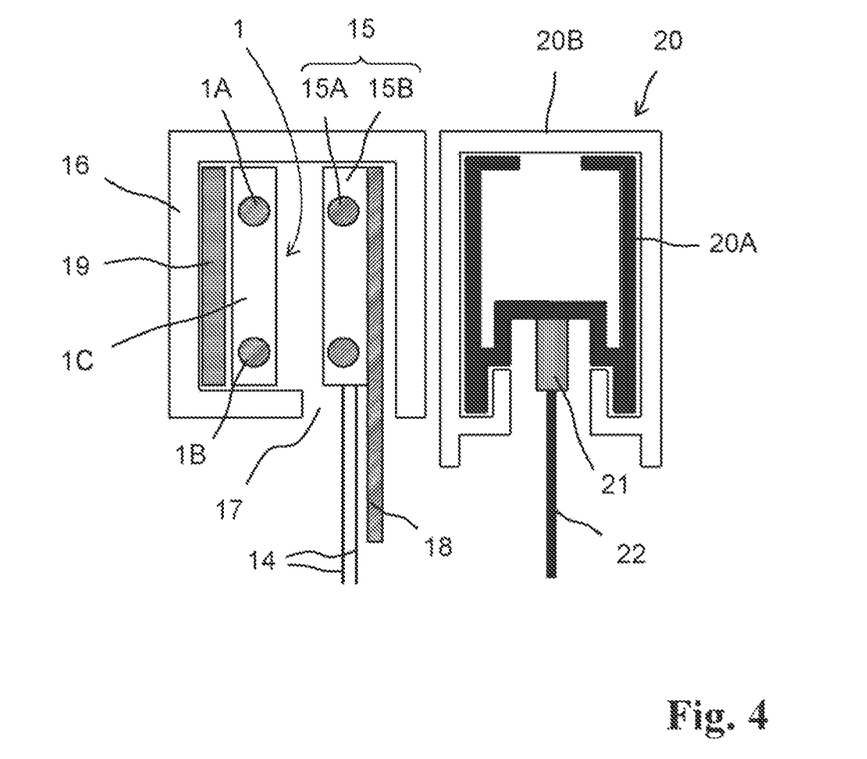
FIG. 4 shows an arrangement of a communication inductance relative to a data line inside a shield.

FIG. 4 shows a cross-sectional view of the data line 1 of a preferred embodiment of the invention, in which the data line 1 is surrounded by a metallic shield 16, which in this case has the form of a hollow profile consisting of aluminum, for example. The data line 1 consists of an untwisted two-wire line with two wires 1A and 1B parallel to one another, which are embedded into an insulation 1C made of plastic. The shield 16 has a rectangular cross-sectional shape and has a longitudinal slot 17, through which a communication inductance 15 is introduced into its interior, on one side of the shield, close to a corner. The communication inductance 15 consists of a conductor loop 15A and insulation 15B made of plastic in which the conductor loop 15A is embedded.

The two-wire supply line 14 for the communication inductance 15 is led out of the shield 16 along a mount 18, to which the insulation 15B of the communication inductance 15 is fixed. By means of the mount 18, the communication inductance 15 can be initially introduced through the slot 17 into the interior of the shield 16 in the position shown in FIG. 4 and adjacent to the data line 1, in order to produce a magnetic coupling thereto. For this purpose, the communication inductance 15 need only be moved into the shield 16 in a straight line parallel to the plane defined by the two wires 15A and 15B of the data line. Then, the communication inductance 15 can be displaced along the data line 1, i.e. perpendicular to the viewing plane of FIG. 4, while retaining this position.

A spacer 19, by the thickness of which the distance between the insulation 1C of the data line 1 and the insulation 15B of the communication inductance 15 can be adjusted for given inside dimensions of the shield 16, is located between the shield 16 and the insulation 1C of the data line 1. The insulation 1C of the data line 1 is fixed to the inner side of the adjacent wall of shield 16 via the spacer 19. The spacer 19 is an optional element. With an appropriate adaptation of the shape of the shield 16 to the lateral dimensions of the data line 1 and the communication inductance 15 and its mount 18, the spacer 19 can be dispensed with and the insulation 1C of the data line 1 can be mounted directly on the inner side of the shield 16, preferably by gluing.

In the embodiment according to FIG. 4, the shield 16 is arranged adjacent to and in parallel with an energy line in the form of a collector line 20, which consists of a busbar 20A and an insulating profile 20B open at one side. The shield 16 can also be mechanically connected to the insulating profile 20B. A current collector 21 contacts the busbar 20A on the open side of the insulating profile 20B, lying at the bottom in FIG. 4. The current collector 21 is fixed to a mount 22 and is guided thereby during operation along the busbar 20A, i.e. perpendicular to the viewing plane FIG. 4. Both the mount 22 for the current collector 21 and the mount 18 for the communication inductance 15 are fixed to the moving object to be supplied with power, so that both move parallel to one another during movement of the object. Electric power can be continuously withdrawn from the busbar 20A, and a wireless inductive communication between the data line 1 and the communication inductance 15 can take place continuously.

The orientation of the collector line 20 and the shield 16 in FIG. 4 is intended purely as an example. Thus the busbar 20A could also be contacted laterally or from above, and the slot 17 could also be located laterally or at the top on the shield 16. The slot 17 and the opening of the insulation profile 20B also need not be located alongside each other, but could instead be located at opposite sides of the arrangement, for example, by rotating the collector line 20 together with the current collector 21 and its mount 22 by 180° relative to the position illustrated in FIG. 4.

It is understood that the invention is also applicable to systems with considerably more than only two moving objects 2 and 2A, as shown for the sake of example in FIG. 1. Furthermore, the communication between a central control unit 4 and several moving objects 2 and 2A is not the only item of interest; instead the moving objects 2 and 2A could also communicate directly with one another, and this would in principle also be possible even if there were no central control unit 4, but instead the data line 1 were terminated at both ends with the terminating resistor 5.

The invention claimed is:

1. Apparatus for power transmission to and data communication with a track-bound or rail-bound moving object which receives power from a transmission line running along an intended movement path of the object, in particular in the form of a collector line that can be contacted by a current collector to supply moving loads, from which line electric power can be withdrawn by the object during movement, the apparatus comprising:
   a separate data line running parallel to the power transmission line;
   at least one communication inductance that is arranged on the object and that can be magnetically coupled to the data line;
   a communication device connected to the communication inductance including a modem that operates according to an orthogonal frequency multiplex method at a data rate of at least 50 Mbit/sec; and
   a metallic shield surrounding the data line and forming an interior space, the metallic shield separating the data line from the power transmission line, the metallic shield having a slot extending along its longitudinal direction through which the communication inductance can be introduced into the interior space to a position adjacent to the data line to thereby magnetically couple the communication inductance to the data line while the object is moving.

2. Apparatus according to claim 1, wherein the mode of operation of the modem complies with a standard for data transmission via power supply networks.

3. Apparatus according to claim 1, wherein the mode of operation of the modem complies with the ITU G.9960 standard or the IEEE P1901 standard or the HomeplugAV standard or the G.hn standard.

4. Apparatus according to claim 1, wherein the modem is connected via an amplifier and or a transformer to the communication inductance.

5. Apparatus according to claim 1, wherein one end of the data line is connected to a communication device connected to a central control unit and containing a modem of the same type as the one that the communication device of the moving object has.

6. Apparatus according to claim 5, wherein the modem of the communication device connected to the central control unit is connected to the data line via an amplifier and/or a transformer.

7. Apparatus according to claim 1, wherein the modem of the communication device and/or the modem of the communication device has an Ethernet LAN port according to the IEEE 802.3 standard as the user interface.

8. Apparatus according to claim 1, wherein the data line is constructed as an untwisted symmetric two-wire line with a longitudinal axis, and the communications inductance is constructed as a coil that has a symmetrical cross-sectional shape.

9. Apparatus according to claim 8, wherein the coil is constructed as a multilayer circuit board and the individual wirings are arranged on different layers of the circuit board and are connected to one another in series by means of through-hole contacts, or wherein the coil has only a single winding and is arranged on one layer of a circuit board.

10. Apparatus according to claim 8, wherein the coil is constructed as a wire loop with one turn or as a wire winding with several turns.

11. Apparatus according to claim 8, wherein the coil is arranged on a moving object in such a manner that its cross-sectional surface is parallel in operation to the plane defined by the wires of the data line, and wherein the length x in m of the data line, the lateral distance y in mm of the central axis of the coil from the longitudinal central axis of the data line, the shortest distance z in mm of a coil end face from the plane defined by the wires of the data line and the sum L in m of the lengths of a supply line connecting the coil to the communication device of the moving object and of a supply line connecting the communication device connected to the central control unit to the data line satisfy at least approximately the condition $$(100 \cdot e') \cdot (b \cdot y^3 + c \cdot y^2 + d \cdot y + 1) \cdot (e \cdot (z-10)^3 + f \cdot (z-10)^2 + g \cdot (z-10) + 1) \cdot (h \cdot L^2 + i \cdot L + 1) \geq 5$$

wherein, the following applies to the parameters a, b, c, d, e, f, g, h and i:

$-0.13 \leq a \leq -0.11$ $-1.75 \cdot 10^{-5} \leq b \leq -1.45 \cdot 10^{-5}$ $3.0 \cdot 10^{-4} \leq c \leq 3.6 \cdot 10^{-4}$ $-3.4 \leq d \leq -2.7 \cdot 10^{-3}$ $-3.9 \cdot 10^{-5} \leq e \leq -3.1 \cdot 10^{-5}$ $2.7 \cdot 10^{-3} \leq f \leq 3.3 \cdot 10^{-3}$ $-9.5 \cdot 10^{-2} \leq g \leq -7.7 \cdot 10^{-2}$ $2.5 \cdot 10^{-5} \leq h \leq 3.1 \cdot 10^{-5}$ $-8.4 \cdot 10^{-3} \leq i \leq -6.8 \cdot 10^{3}$.

12. Apparatus according to claim 8, wherein the coil is arranged on the moving object in such a manner that the cross-sectional surface of the coil during operation is perpendicular to the plane defined by the wires of the data line and wherein the length x in m of the data line, the lateral distance y in mm of the central axis of the coil from the plane defined by the wires of the data line, the shortest distance z in mm of a coil end face from the closest wire of the data line and the total L in m of the lengths of a supply line connecting the coil to the communication device of the moving object and a supply line connecting the communication device, which is connected to the central control unit, to the data line satisfy at least approximately the condition $(100 \cdot e^{a \cdot x}) \cdot (c \cdot y^2 + d \cdot y + 1) \cdot (e \cdot (z-10)^3 + f \cdot (z-10)^2 + g \cdot (z-10) + 1) \cdot (h \cdot L^2 + i \cdot L + 1) \geq 5$ wherein, the following applies to the parameters a, c, d, e, f, g, h and i:

$-0.13 \leq a \leq -0.11$ $1.6 \cdot 10^{-4} \leq c \leq 2.1 \cdot 10^{4}$ $-2.6 \cdot 10^{-2} \leq d \leq -2.1 \cdot 10^{-2}$ $-2.4 \cdot 10^{-5} \leq e \leq -2.0 \cdot 10^{-5}$ $1.8 \cdot 10^{-3} \leq f \leq 2.2 \cdot 10^{-3}$ $-7.5 \cdot 10^{-2} \leq g \leq -6.1 \cdot 10^{-2}$ $2.5 \cdot 10^{-5} \leq h \leq 3.1 \cdot 10^{-5}$ $-8.4 \cdot 10^{-3} \leq i \leq -6.8 \cdot 10 -3$.

13. Apparatus according to claim 1, wherein the data line is constructed as an untwisted symmetrical two-wire line and is arranged inside the shield laterally offset relative to the slot in such a manner that the communication inductance can be introduced by a straight-line movement into the position adjacent to the data line in the interior of the shield.

14. Apparatus according to claim 1, wherein the shield is a hollow profile made of at least one of metal and metal-coated plastic, which simultaneously functions as a mechanical carrier for the data line.

15. Apparatus according to claim 1, wherein the shield and a mount of the communication inductance are respectively mechanically connected to a carrier of the power line and to a mount of a current collector.

16. A method for power transmission to and data communication with a track-bound or rail-bound moving object, the method comprising:

providing a communication device including a modem that is configured for communication between stationary subscribers via power supply lines of a building and which operates according to an orthogonal frequency multiplexing method with a data rate of at least 50 Mbit/sec;

providing a data line extending along a movement path of the object, the data line connected to the communication device and disposed parallel to and separate from a power transmission line, the power transmission line including a collector line that can be contacted by a current collector of the object for electrically supplying moving loads wherein electrical energy can be extracted by the object and data can be picked up during movement of the object; and introducing at least one communication inductance connected to the object, wherein the communication device is a component of an apparatus according to claim 1.

17. A method for power transmission to and data communication with a track-bound or rail-bound moving object, the method comprising:

providing a communication device including a modem that is configured for communication between stationary subscribers via power supply lines of a building and which operates according to an orthogonal frequency multiplexing method with a data rate of at least 50 Mbit/sec;

providing a data line extending along a movement path of the object, the data line connected to the communication device and disposed parallel to and separate from a power transmission line, the power transmission line including a collector line that can be contacted by a current collector of the object for electrically supplying moving loads;

introducing a communication inductance connected to the object into a metallic shield surrounding the data line and forming an interior space, the metallic shield separating the data line from the power transmission line, the metallic shield having a slot extending along its longitudinal direction through which the communication inductance can be introduced into the interior space to a position adjacent to the data line to thereby magnetically couple the communication inductance to the data line while the object is moving.

\* \* \* \* \*

UNITED STATES PATENT AND TRADEMARK OFFICE
CERTIFICATE OF CORRECTION

| | | |
|---|---|---|
| PATENT NO. | : 9,172,435 B2 | Page 1 of 1 |
| APPLICATION NO. | : 13/983627 | |
| DATED | : October 27, 2015 | |
| INVENTOR(S) | : Benjamin Rhein et al. | |

It is certified that error appears in the above-identified patent and that said Letters Patent is hereby corrected as shown below:

Title page,

Item (73) Assignee: correct the address "Weil am Rheim" to --Weil am Rhein--

Signed and Sealed this
Thirty-first Day of May, 2016

Michelle K. Lee
*Director of the United States Patent and Trademark Office*